(12) United States Patent
Miyazaki et al.

(10) Patent No.: US 6,816,969 B2
(45) Date of Patent: Nov. 9, 2004

(54) DIGITAL SIGNATURE GENERATING METHOD AND DIGITAL SIGNATURE VERIFYING METHOD

(75) Inventors: Kunihiko Miyazaki, Yokohama (JP); Ryoichi Sasaki, Fujisawa (JP); Kazuo Takaragi, Ebina (JP); Seiichi Susaki, Yokohama (JP); Hisanori Mishima, Yokohama (JP); Takeshi Matsuki, Musashino (JP); Kunihito Takeuchi, Yokosuka (JP); Mitsuru Iwamura, Tokyo (JP); Tsutomu Matsumoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 711 days.

(21) Appl. No.: 09/797,260

(22) Filed: Feb. 28, 2001

(65) Prior Publication Data

US 2002/0108044 A1 Aug. 8, 2002

(30) Foreign Application Priority Data

Dec. 7, 2000 (JP) .................................... 2000-377990

(51) Int. Cl.[7] .............................................. G06F 17/00
(52) U.S. Cl. ........................ 713/180; 713/178; 713/176
(58) Field of Search ................................ 713/168–181, 713/150–154

(56) References Cited

U.S. PATENT DOCUMENTS

| | | | |
|---|---|---|---|
| 5,136,646 A | 8/1992 | Haber et al. | |
| 5,956,404 A | 9/1999 | Schneier et al. | |
| 6,738,902 B1 | * 5/2004 | Ruppert et al. | ............. 713/162 |
| 6,738,912 B2 | * 5/2004 | Buttiker | ....................... 713/201 |
| 6,748,529 B2 | * 6/2004 | Smith | .......................... 713/153 |

FOREIGN PATENT DOCUMENTS

JP 3278721 B 2/2002

OTHER PUBLICATIONS

Campbell, Supporting digital signatures in mobile environments, Enabling Technologies: Infrastructures for Collaborative Enterprises, 2003, Twelfth IEEE International Workshops on, Jun. 9–11, 2003, pp. 238–242.*

Yen et al., Fast algorithms for LUC digital signature computation, Computers and Digital Techniques, IEE Proceedings, vol. 142, Issue 2, Mar. 1995, pp. 165–169.*

Wong et al., Digital signatures for flows and multicasts, Networking, IEEE/ACM Transactions on, vol. 7, Issue 4, Aug. 1999, pp. 502–513.*

* cited by examiner

Primary Examiner—David Jung
(74) Attorney, Agent, or Firm—Townsend and Townsend and Crew LLP

(57) ABSTRACT

In a signature generating method where not necessarily all of a plurality of signature generating devices work together each time to generate signatures, the present invention seeks to correctly and securely reflect data relating to previous signatures.

When generating signatures, the data used for the next signature is sent beforehand to the other signature generating devices. Also, when generating signatures, at least one of the devices is used consecutively, thus allowing history data to be shared during signature generation.

13 Claims, 10 Drawing Sheets

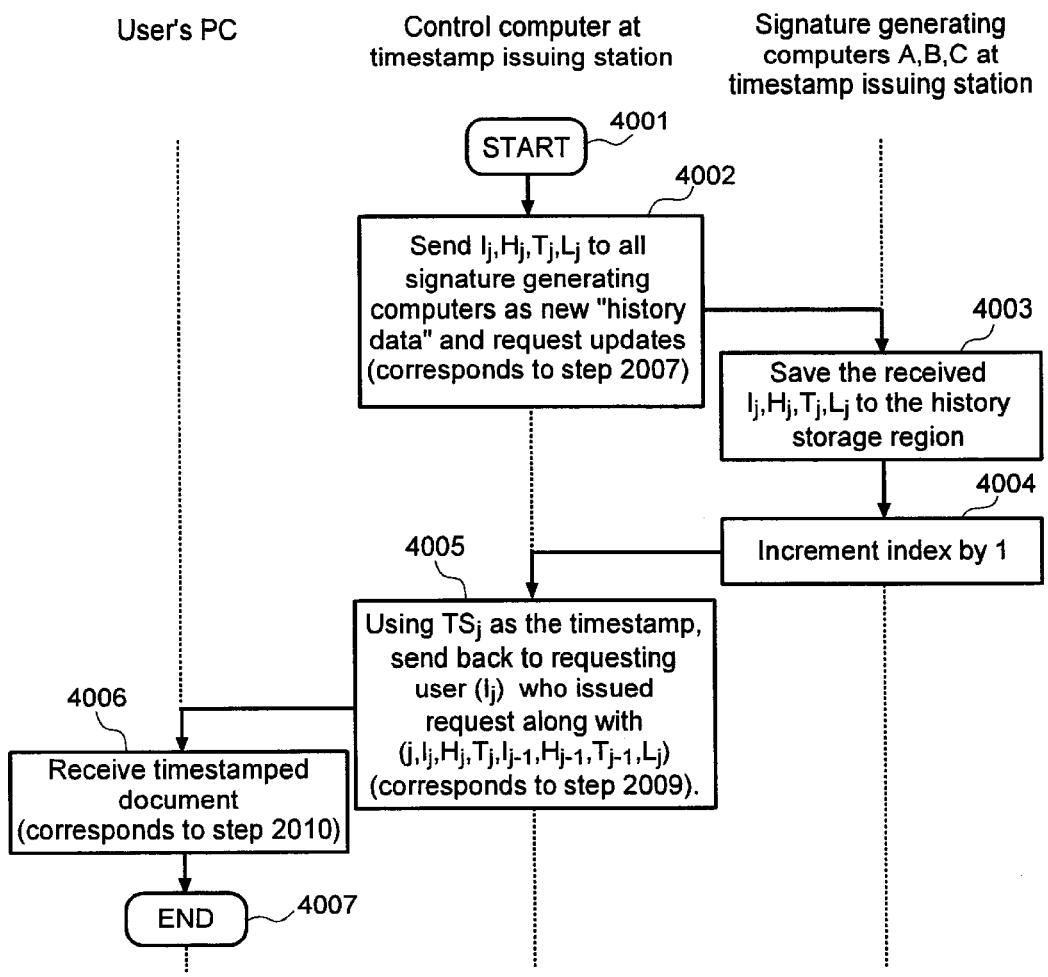
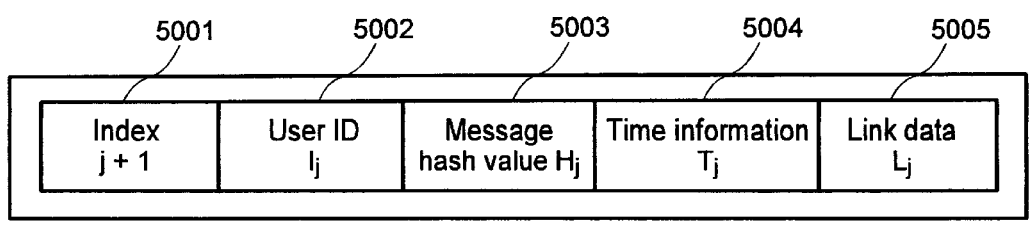

DIGITAL SIGNATURE GENERATING METHOD AND DIGITAL SIGNATURE VERIFYING METHOD

CROSS REFERENCES

This application relates to Japanese Patent Application Reference Nos. 11-301216 filed Oct. 22, 1999, 2000-081712, filed Mar. 17, 2000 and 2000-313123, filed Oct. 06, 2000, which will be soon filed as a U.S. Patent Application corresponding thereto, and the disclosures of which are incorporated herein by references for all purposes.

This application also relates to Japanese Patent Application Reference Nos. 2000-035631, filed Feb. 08, 2000, 2000-081713, filed Mar. 17, 2000 and 2000-313122, filed Oct. 06, 2000, which will be soon filed as a U.S. Patent Application corresponding thereto, and the disclosures of which are incorporated herein by references for all purposes.

BACKGROUND OF THE INVENTION

The present invention relates to a technology for guaranteeing the legitimacy of multimedia data.

Digital signature technology provides a function corresponding to conventional signatures for electronic digitized data such as documents (also referred to as multimedia data). In digital signature technology, a digital signature generator applies a private key, which the generator keeps secret, to a digitized data (hereinafter referred to as message) M to be signed or a hash value thereof, a hash value being a characteristic value for the message (also referred, to as a compression value or message digest). From this, a digital signature A for the message M is generated. The digital signature A is then added to the message M and made public. A digital signature verifier compares the message M or the hash value thereof to the result obtained from applying a public key corresponding to the private key to the digital signature A added to the message M. If the two do not match, the message M may have been tampered with after the digital signature A was generated. Thus, if the two do match, it confirms that the digital signature A was generated for the message M.

There is also a technology known as timestamping that uses digital signatures to guarantee that a message existed at a certain point in time. In this technology, a digital signature is generated for data formed by combining the message and the current time information. This guarantees that the message existed at that particular time.

A "threshold signature" technology has been proposed to allow operations to continue safely even if some devices have been rendered unusable due to malfunctions or the like. In this technology, a plurality of entities work together to generate a signature. If a fixed number of entities are available, a signature can be generated, but otherwise it will not be possible to correctly generate a signature.

Furthermore, a technology has been developed that prevents improper acts such as cases where the digital signature generator himself tampers with the message, generates a new digital signature, and replaces the original message and the digital signature.

In this technology, the digital signature generator generates a digital signature $A_n$ for a message $M_n$ by applying a private key, which is kept secret, to: the message $M_n$ to be signed or a hash value thereof; data relating to the generation of a digital signature $A_{n-1}$; and time data. As a result, the digital signature $A_{n+1}$ generated after the digital signature $A_n$ will reflect data relating to the previously generated digital signature $A_n$. If the digital signature generator himself tampers with the $M_n$, generates a new digital signature $A_n$, and uses these to replace the original message $M_n$ and the digital signature $A_n$, there will be an inconsistency with the digital signature $A_{n+1}$.

The technology to prevent the improper act described above does not take into account the technology in which a plurality of devices work together to generate signatures. The combination of these technologies is desirable.

SUMMARY OF THE INVENTION

The present invention provides a technology that reliably prevents improper acts even when a plurality of devices work together to generate digital signatures.

the present invention also provides a method in which previously generated signatures are reflected and in which not all devices are needed when generating signatures.

the present invention also provides a technology that reliably prevents improper acts even if the data relating to the generation of the digital signature $A_n$ and used in generating the digital signature $A_{n+1}$ is lost for some reason.

In other words, if a section of signature data forming a chain is lose, the present invention provides a method or a system for guaranteeing the sequential relationship between the signature data with the exception of the lost data.

the present invention also provides service system that uses the method described above and the devices used therein or a program that functionally implements the functions thereof.

Accordingly to the present invention, when signatures are generated with a plurality of devices, at least one signature generating device exists that is involved in consecutive signature generating operations.

More specifically, data involved in a signature generated by the plurality of devices and which is used in the generation of the next signature is stored in all the signature generating devices whether or not they were involved in generating the signature. This data can also be shared by being stored in a safe place and being accessible in a secure manner by all the signature generating devices.

With this implementation, no matter what combinations of signature generating devices are used to generate a signature, these signature generating devices will hold data relating to the previous signature generating operation.

Also, the present invention can be formed so that when a signature is generated, a plurality of data relating to previously generated signatures is used so that the chain (sequential relations) between individual signatures can be confirmed. As a result, if part of the chain cannot be confirmed due to data loss, the presence of an unauthorized party, or the like, the other links can be confirmed so that disrupting the chain of signatures extending from the past to the present is made difficult.

According to the present invention, techniques, including a method and system, for generating digital signatures using n devices and for verifying the digital signatures are provided.

In one embodiment of the present invention provides a method for sequentially generating digital signatures using n devices, each of the devices equipped with signature generator.

The method includes: generating a history data j when generating a j-th digital signature ($j \geq 1$); storing, in m devices ($1 \leq m \leq n$) out of the n devices involved in an i-th digital signature generating operation, the history data j; and generating an i-th digital signature i using at least one of the L ($1 \leq L < i$) stored history data $j_1$–$j_L$.

In the method, the history data j may be either digital signature j generated by the j-th signature generating operation or data used when generating the digital signature j generated by the j-th signature generating operation.

In the method, the history data j may be generated in one of the m devices involved in an i-th digital signature generating operation.

In further embodiment of the present invention, the method for generating digital signatures may include: sending a most recent stored history data to m−1 other devices; selecting most recent history data from m units of history data, formed from m−1 units of history data sent by the m−1 other devices and a most recent history data stored locally; and using the most recent history data as one of history data used when generating the i-th digital signature.

In further embodiment of the present invention, the history data j may be generated on one of the n-m devices, and the method may include: sending, in at least one device of the n-m devices, the history data j to the m devices; and storing, in the m devices, the sent history data.

In the method, a history data (i−1) and at least one history data k (k<i−1) may be used as history data used in the step for generating a new i-th digital signature.

In further embodiment of the present invention, the method for generating digital signatures may include: generating an i'-th digital signature i' (i'≠i, i'>j) using the history data used in said step of generating an i-th digital signature.

In another embodiment of the present invention provides a method for verifying digital signatures generated by using the method for generating digital signatures.

The method includes: confirming that, when verifying the digital signature i, use of a plurality of history data, each of the history data used in the step for generating an i-th digital signature, satisfies a predetermined rule.

In the method for verifying digital signatures, the predetermined rule may be that all of the plurality of history data is used in the step for generating the i-th digital signature.

In the method for verifying digital signatures, the predetermined rule may be defined during system operation, during signature generation, or during signature verification.

In another embodiment of the present invention provides a method for verifying digital signatures generated by using the method for generating digital signatures.

The method includes: confirming that, when verifying the digital signature i, use of a history data i in at least one step for generating digital signature h(h>i), the history data i is generated in a step for generating the digital signature i, satisfies a predetermined rule.

In the method for verifying digital signatures, the predetermined rule may be that the history data i is used in all of the steps for generating digital signature h.

In the method for verifying digital signatures, the rule may be defined during system operation, during signature generation, or during signature verification.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 4 illustrates a flowchart showing the detailed operations performed at step 2007 from the schematic flowchart of the first embodiment of the present invention.

FIG. 5 illustrates a figure showing a history storage region in the signature generating computers in the first embodiment of the present invention.

DETAILED DESCRIPTION OF THE PREFERRED EMBODIMENTS

Documents relating to digital signature technology include the following:

Document 1: Alfred J. Menezes, Paul C. van Oorschot, and Scott A. Vanstone, "Handbook of Applied Cryptography" CRC Press, Inc. 1997

Document 2: Bruce Schneier, "Applied Cryptography Second Edition", John Wiley & Sons, Inc. 1996

Document 3: "Standard Specifications for Public Key Cryptography (Draft Version 11)" IEEE P1363, IEEE, July 1999

Documents relating to timestamping technology include "CHAPTER 4 Intermediate Protocols, 4.1 TIMESTAMPING SERVICES", p.75 from Document 2 above, as well as:

Document 4: International Application No. PCT/US91/05386

Document 5: International Application No. PCT/US99/19061

Document 6: Ahto Buldas, Helger Lipmaa, and Berry Schoenmakers, "Optimally Efficient Accountable Time-Stamping"

Document 7: Ahto Buldas, Peeter Laud, Helger Lipmaa, and Jan Villenmson, "Time-Stamping with Binary Linking Schemes"

Threshold signatures are described in the following documents.

Document 8: M. Cerecedo, T. Matsumoto, and H. Imai, "Efficient and Secure Multiparty Generation of Digital Signatures Based on Discrete Logarithms," IEICE Trans. Fundamentals, Vol.E76-A, No.4, pp.532–545, April 1993.

Document 9: R. Gennaro, S. Jarecki, H. Krawczyk, and T. Rabin, "Robust Threshold DSS Signatures," In Proc. of Eurocrypt '96, LNCS 1070, Springer-Verlag, pp.354–371, 1996.

Document 10: C. Park and K. Kurosawa, "New ElGamal Type Threshold Digital Signature Scheme," IEICE Trans. Fundamentals, vol.E79-A, no.1, pp.86–93, January 1996.

Document 2 and Document 4 describe linking protocols, which correspond to the technology described above used to prevent improper acts such as when the creator of the digital signature tampers with a message and generates a new digital signature, which is then used to replace the original message and digital signature.

First Embodiment

An embodiment in which the present invention is implemented for a timestamping service operating through a network will be described with references to the drawings.

Figure 1:
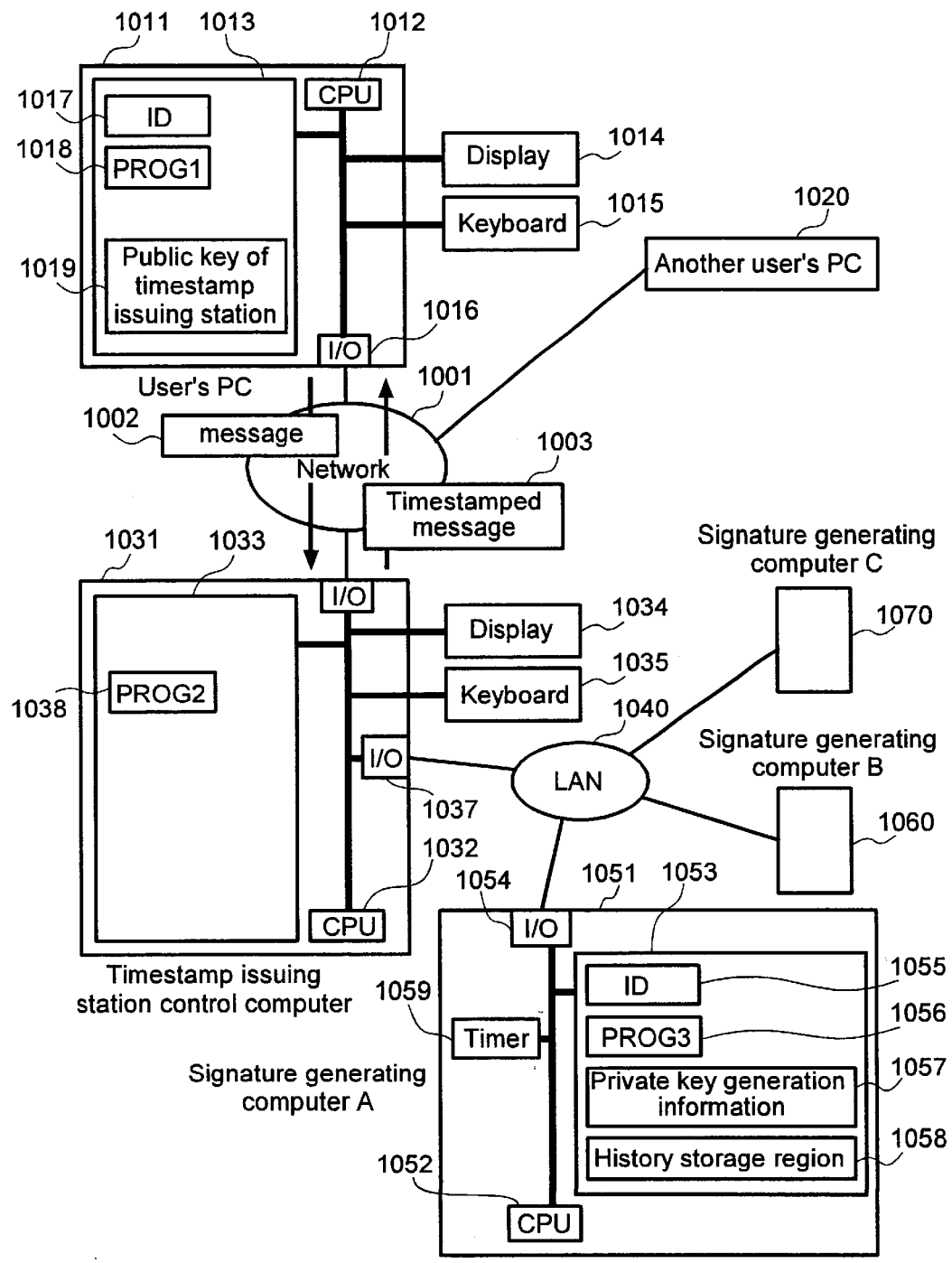
FIG. 1 illustrates a schematic drawing of a system in which a first embodiment of the present invention is implemented.

FIG. 1 shows a schematic system architecture of this embodiment. A network 1001 connects a control computer 1031 of a timestamp issuing station, and a plurality of user PCs 1011, 1020. A user creates a message 1002 and sends it from the user PC 1011 to the timestamp issuing station by way of the network 1001 so that it can later be proved that the message existed at that particular time. The timestamp issuing station computer 1031 receives the message 1002 from the user and issues a timestamp for the message 1002 to serve as time guarantee information. A timestamped message 1003 formed from the message 1002 and the timestamp is then sent back to the user's PC 1011. The user PC 1011 receives the timestamped message 1003.

The timestamps in this embodiment use a technology based on the linking protocol described above. In addition to the message and time information, the timestamp issuing station generates a digital signature for information added to the data relating to timestamps issued immediately before.

Furthermore, digital signatures are generated in the present invention using threshold signature technology to provide further security and reliability. More specifically, a k-out-of-n threshold signature system is used. This system uses n computer units (signature generating devices). Signature generation can be performed correctly when any k units are available, but correct signature generation cannot be performed with n-k units. In addition to document 8 through document 10 described above, threshold signatures are described in Document 11: Japanese laid-open patent publication No. Hei 11-307993

This document discloses a threshold signature technology that does not require secret communication when generating signatures. For example, by using this threshold signature technology, if n-k units of the n signature generating device units are malfunctioning for some reason, digital signatures can be generated using the remaining k units. Also, even if information that was to be kept secret is for some reason leaked out from n-k units of the n signature generating device units, performing improper acts such as forging digital signatures is difficult. Thus, a highly secure and reliable timestamp issuing system can be provided.

The embodiment described below will use a 2-out-of-3 threshold signature technology, but the values of k and n can be chosen as appropriate for the desired level of security, reliability, price vs. performance, and the like.

The user PC 1011 is formed from a CPU 1012, a memory 1013, an I/O 1016, a display 1014, a keyboard 1015, and a bus connecting these elements. The user PC 1011 is also connected to the network 1001 by way of the I/O 1016. The memory 1013 contains a user ID 1017, a program PROG1 1018, and a timestamp issuing station public key 1019. The program is transferred to the CPU 1012 through the bus to implement different features.

At the timestamp issuing station, the timestamp issuing station control computer 1031, a signature generating computer A 1051, a computer B 1060, and a computer C 1070 are connected by a LAN 1040. Depending on the threshold signature technology used, the LAN 1040 may need to protect the information going through it using known encryption technology or physical device.

The timestamp issuing station control computer 1031 is formed from a CPU 1032, a memory 1033, a network connection I/O 1036, a LAN connection I/O 1037, a display 1034, a keyboard 1035, and a bus connecting these elements. The control computer 1031 is connected to the network 1001 by way of the network connection I/O 1036 and is connected to the LAN 1040 by way of the LAN connection I/O 1037. A program PROG2 1038 is stored in the memory 1033.

The signature generating computer A 1051, computer B 1060, and computer C 1070 at the timestamp issuing station basically have the same architecture and are formed from a CPU 1052, a memory 1053, a LAN connection I/O 1054, a timer 1059, and a bus connecting these elements. The LAN connection I/O 1037 provides a connection to the LAN 1040. Some method is used beforehand to synchronize the timer 1059 with the other signature generating computers. The memory 1053 contains an ID 1055, a program PROG3 1056, private key generating information 1057, and a history storage region 1058 for storing data (hereinafter referred to as history data) that was used when a previous or earlier digital signature was generated. The ID 1055 and the private key generating information 1057 are set up with fixed values specific to each computer.

The private key generating information 1057 is data that should be kept stored securely in each of the signature generating computers. The private key generating information is stored beforehand in a distributed manner so that when signature generating computers are available in a manner that satisfies predetermined conditions (since this embodiment uses 2-out-of-3 threshold signatures, when any two of the three computers are available) the private key generating information stored in these computers can be used to recreate the private key information of the timestamp issuing station. The specific methods used to store the private key generating information in a distributed manner are described, for example, in document 8 through document 11.

Figure 2:
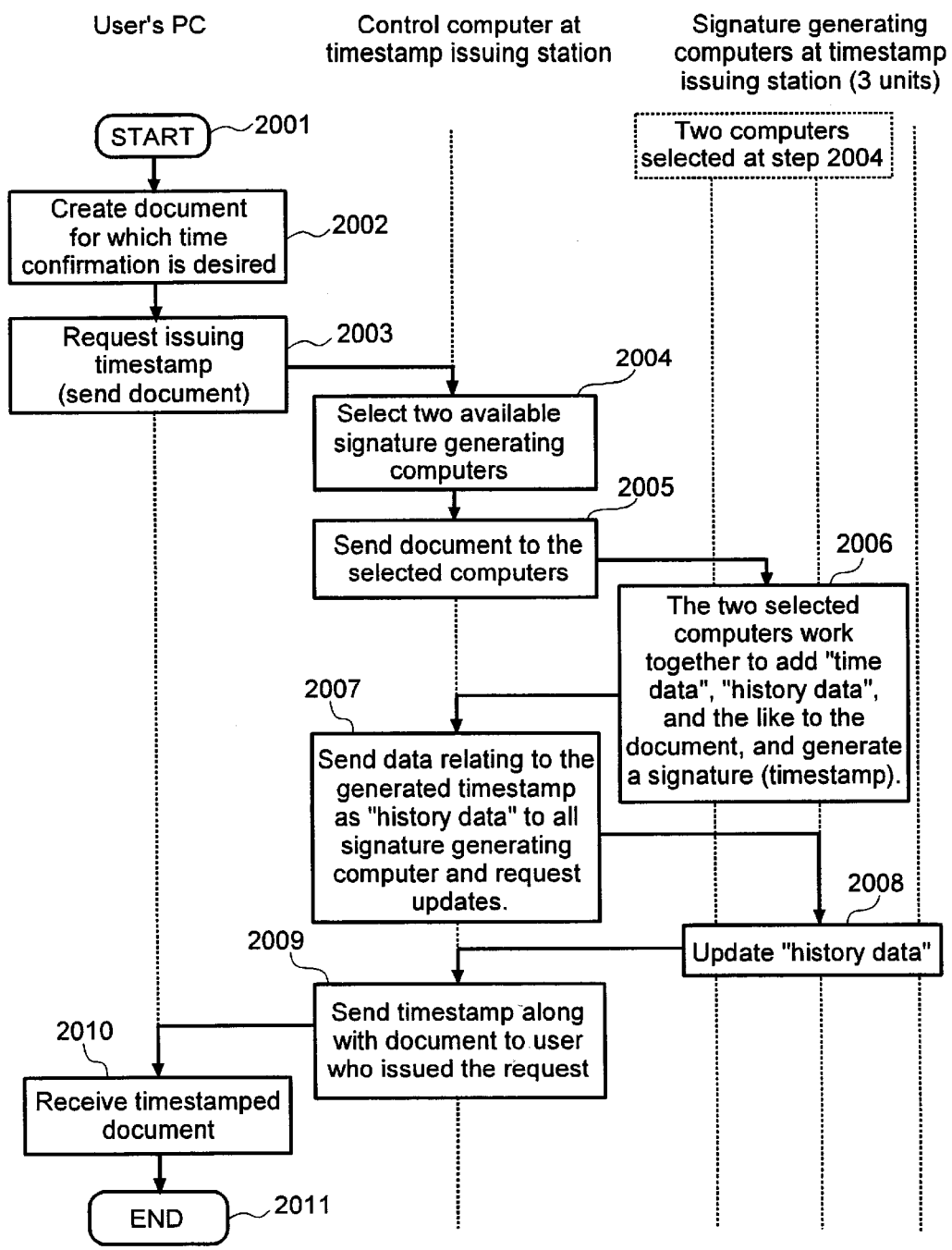
FIG. 2 illustrates a flowchart showing the operations performed when issuing timestamps in the first embodiment.

FIG. 2 is a flowchart of the operations performed in this embodiment. In the flowchart, steps 2001, 2002, 2003, 2010, and 2011 are implemented by having the CPU 1012 execute the program PROG1 1018 stored in the memory 1013 of the user PC 1011. Similarly, steps 2004, 2005, 2007, and 2009 are implemented by having the CPU 1032 execute the PROG2 1038 in the timestamp issuing station control computer 1031. Steps 2006, 2008 are implemented by having the CPU 1052 execute the PROG 1056 in the timestamp issuing station signature generating computer A 1051.

Flow of Operations for Issuing Timestamps

Step 2001: Start

Operations Performed by the User PC

Step 2002: Create document for which time confirmation is desired.

Step 2003: Request the timestamp issuing station to issue a timestamp (send a hash value $H_n$ of the document m and a user ID $I_n$ to the timestamp issuing station)

Operations Performed by the Timestamp Issuing Station Control Computer 1031

Step 2004: Select two available signature generating computers out of the three signature generating computers.

Step 2005: Send the document received from the user PC to the signature generating computers selected at step 2004.

Operations Performed by the Timestamp Issuing Station Signature Generating Computers (The Computers Selected at Step 2004)

Step 2006: The two selected computers work together to add "time data", "history data", and the like to the document, generate a signature (timestamp) according to a threshold signature method, and send the result to the control computer. Depending on the threshold signature method used, there can be multiple communications between the signature generating computers and the control computer.

Operations Performed by the Timestamp Issuing Station Control Computer 1031

Step 2007: The data used to generate the signature (timestamp) created by the timestamp issuing station signature generating computers is sent as the newest "history data" to all signature generating computers regardless of whether or not they were involved in the generation of the signature.

Operations Performed by the Timestamp Issuing Station Signature Generating Computers (All Computers)

Step 2008: Each of the signature generating computers use the data received from the control computer to update the history storage region in its memory and then indicates to the control computer that the update was successful.

Operations Performed by the Timestamp Issuing Station Control Computer 1031

Step 2009: The timestamped message 1003, formed from the document and the generated signature (timestamp), is sent to the user PC that issued the request.

Operations Performed by the User PC

Step 2010: The user receives the timestamped document from the timestamp issuing station. The public key of the timestamp issuing station is used to confirm that the timestamp is legitimate. The timestamped document is accepted.

Step 2011: End

In this embodiment, data used when generating the signature (timestamp) is sent to all the signature generating computers as the newest "history data" at step 2007. Thus, when generating a signature, all the signature generating computers contain the latest history data for that point in time. As a result, any two signature generating devices can be used to generate a signature correctly. In step 2007, history data is sent to all the signature generating computers. However, computers involved in the generation of the signature can already obtain this data when the signature is generated. Thus, it would be possible to have the data sent only to the computer that was not involved in the generation of the signature.

Figure 3:
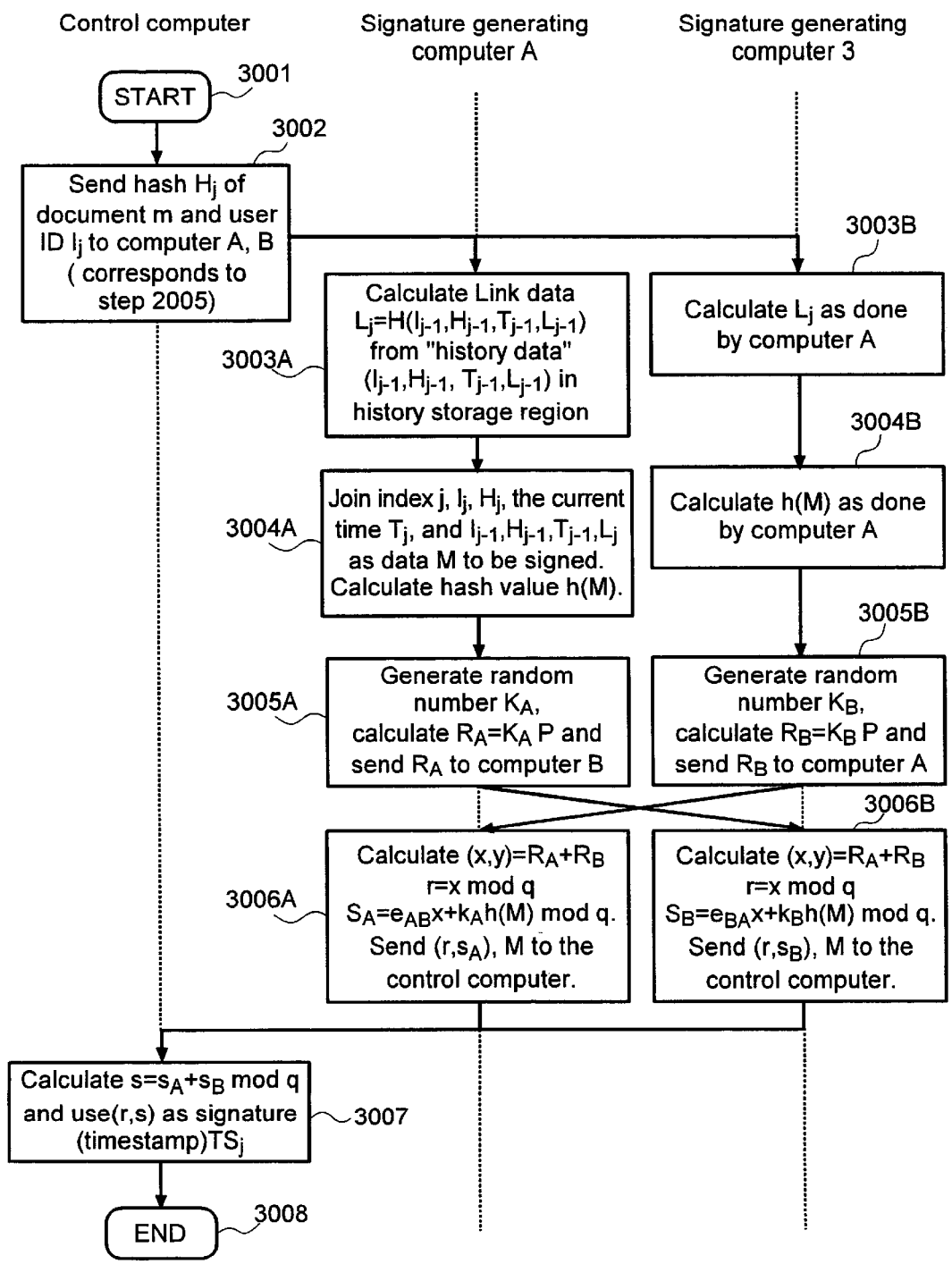
FIG. 3 illustrates a flowchart showing the detailed operations performed at step 2006 from the schematic flowchart of the first embodiment of the present invention.

FIG. 3 shows the detailed flow of operations performed at step 2006 of "timestamp issuing operations" when a timestamp based on the linking protocol described above is used with the threshold signature method indicated in document 11. It is assumed here that the signature generating computers selected at step 2004 are the computer A 1051 and the computer B 1060. Also, the data used when generating a private key with the private key generating information stored in a computer I (where I=A or B or C) along with a computer J is expressed as $e_{IJ}$. Furthermore, elliptic curve encryption is used as the basis for digital signatures. The basic arithmetic operations used to determine the following are placed in each of the computers beforehand.

the order p of the field GF(p) (an odd prime with approximately 160 bits)

the parameters a, b appearing in the definition of an elliptic curve E: $y^2=x^3+ax+b$ mod p the coordinates of b base point P on the elliptic curve E: $(x_P,y_P)$ the order of a group formed from rational points on the elliptic curve E generated by the base point P: q (an odd prime with approximately 160 bits)

as well as addition, doubling, scalar multiplication on elliptic curves and addition, subtraction, multiplication, division, and exponentiation based on primes. These parameters and basic operations are described in document 3.

Detailed Flow of Operations Performed in Step 2006

Step 3001: Start

Operations Performed by the Control Computer

Operations Performed by the Control Computer

Step 3002: Send a hash value $H_j$ of the document m and the user ID $I_j$ to the computer A 1051 and the computer B 1060 (corresponds to step 2005).

Operations Performed by the Signature Generating Computer A 1051

Step 3003A: Calculate $L_j=H(I_{j-1},H_{j-1},T_{j-1},L_{j-1})$ from the "history data" $I_{j-1},H_{j-1},T_{j-1},L_{j-1}$ stored in the history storage region.

Operations Performed by the Signature Generating Computer B 1060

Step 3003B: Calculate $L_j$ as done by the computer A 1051.

Operations Performed by the Signature Generating Computer A 1051

Step 3004A: A data M to be signed is calculated by joining the ID $I_j$ and the hash value $H_j$ received from the control computer, a time $T_j$ obtained from the timer of the computer A 1051, an index j and link data $L_j$ stored as history data in the computer A 1051, and data relating to the last timestamp (user ID $I_{j-1}$, hash value $H_{j-1}$, and time $T_{j-1}$). A hash value h(M) of the data M is also calculated.

Operations Performed by the Signature Generating Computer B 1060

Step 3004B: Calculate hash value h(M) as in step 3004A.

Operations Performed by the Signature Generating Computer A 1051

Step 3005A: Generate a random number $k_A$, where $k_A$ is a natural number and $0<k_A<q$. Calculate a scalar multiple on an elliptic curve $R_A=k_A P$ and send $R_A$ to the computer B 1060.

Operations Performed by the Signature Generating Computer B 1060

Step 3005B: Generate a random number $k_B$, where $k_B$ is a natural number and $0<k_B<q$. Calculate a scalar multiple on an elliptic curve $R_B=k_B P$ and send $R_B$ to the computer A 1051.

Operations Performed by the Signature Generating Computer A 1051

Step 3006A: Calculate the sum $(x,y)=R_A+R_B$ on the elliptic curve and $r=x \pmod q$, $s_A=e_{AB}x+k_Ah(M) \pmod q$. Send r, $S_A$ and M to the control computer.

Operations Performed by the Signature Generating Computer B 1060

Step 3006B: Calculate the sum $(x,y)=R_B+R_A$ on the elliptic curve and $r=x \pmod q$, $S_B=e_{BA}x+k_Bh(M) \pmod q$. Send $r,s_B$ and M to the control computer (r will be the same value calculated at step 3006A by the computer A 1051).

Operations Performed by the Control Computer

Step 3007: Calculate $S=S_A+S_B \pmod q$ and use (r, s) as the timestamp $TS_j$.

Step 3008: End

As in FIG. 3, FIG. 4 is a flowchart showing the flow of operations performed at step 2007 of the "flow of timestamp issuing operations" where a timestamp is issued using a threshold signature based on the linking protocol using a method described in one embodiment in document 11.

Detailed Flow of Operations Performed in Step 2007

Step 4001: Start

Operations Performed by the Control Computer

Step 4002: Send $I_j,H_j,T_j$ to all signature generating computers as new history data and request updates (corresponds to step 2007).

Operations Performed by the Signature Generating Computer A 1051, Computer B 1060, and Computer C 1070 (Performed Independently by Each)

Step 4003: Store received $(I_j,H_j,T_j,L_i)$ in the history storage region.

Step 4004: Increment index by 1.

Operations Performed by the Control Computer

Step 4005: Send back $TS_j$ as a timestamp and $M=(j,I_j,H_j,T_j,I_{j-1},H_{j-1},T_{j-1},L_j)$ to the requesting user ($I_j$) (corresponds to step 2009).

Operations Performed by the User PC

Step 4006: Receive timestamped document (corresponds to step 2010).

Step 4007: End

FIG. 5 shows the state of the history storage region in a signature generating computer right after step 4004 in the flow of operations shown in FIG. 4. The history storage region contains an index j+1 5001, a user ID $I_j$ 5002, a message hash value $H_j$ 5003, time information $T_j$ 5004, and link data $L_j$ 5005.

In the linking protocol described above, the current user's ID ($I_j$) is indicated to the previous user (the user with user ID $I_{j-1}$) after the series of operations described above is completed. This allows confirmation that a link is reflected correctly in the next link. The user receiving the timestamped document can verify the timestamp in the same manner as when threshold signature technology is not used. Specifically, with the public key of the timestamp issuing station, digital signature verification technology is used to confirm the legitimacy of the timestamp (digital signature) $TS_j$ with regard to $(j, I_j, H_j, T_j, I_{j-1}, H_{j-1}, T_{j-1}, L_j)$. To allow more detailed confirmation to make sure there are no irregularities at the timestamp issuing station, the previous user (user ID $I_{j-1}$) can be queried as needed to obtain $L_{j-1}$. This allows confirmation of whether the link data $L_j$ is identical to $H(I_{j-1}, H_{j-1}, T_{j-1}, L_{j-1})$. Similarly, the next user (user ID $I_{j+1}$) can be queried to confirm that $H(I_j, H_j, T_j, L_j)$ calculated from the received data is identical to the link data $L_{j+1}$ contained in the data received by the next user. Furthermore, by repeating these operations and querying users from two or more earlier signatures back or users from two or more later signatures, the legitimacy of a timestamp can be confirmed further.

This embodiment as described above allows signature generating operations such as threshold signatures that involve a plurality of signature generating devices to be implemented in signature generating operations where data relating to the immediately preceding signature generation is reflected in the generation of the next signature.

The description of this embodiment presented a k-out-of-n threshold signature method where correct signatures can be generated when k devices out of n devices are available. However, the present invention is not restricted to this, and it would also be possible to provide a similar implementation for, e.g., a distributed signature technology in which there are four signature generating devices A, B, C, D, and signatures can be generated when either a group consisting of the devices A, B or a group consisting of the devices B, C, D are available. An example of this type of signature technology is presented in document 11.

There is also a technology based on the k-out-of-n threshold signature method where signature generation is requested to k signature generating devices or more and a correct signature can be generated if at least k units are operating properly. To use this type of technology, it would be possible, for example, to have the control computer request signature generation to all signature generating computers rather than just two signature generating computers at step 2004.

Furthermore, in the above embodiment the control computer is implemented separately from the signature generating computers, but it would also be possible to have the features of the control computer implemented in one or more of the signature generating computers. Messages sent from user PCs can be hash values calculated beforehand on the user PC using a hash function.

The embodiment described above has the following requirements.

1. Signature generating computers that are not directly involved in signature generation must also be communicable so that history data can be updated.

2. History data relating to past signature generation in each of the signature generating computers must be set up from outside.

In technologies such as the linking protocol where a generated signature reflects data involved in the immediately preceding signature, security must be maintained by ensuring that the reflected data is in fact data relating to the preceding signature generating operation. In the second point above, the history data set up in each signature generation computer from outside must be confirmed to actually be data relating to the preceding signature generating operation.

Another embodiment that relaxes these conditions is described below.

Second Embodiment

The schematic system architecture in this embodiment is the same as what is shown in FIG. 1. The threshold signature method (or, more generally, the distributed signature generating operation) used in this embodiment has the following characteristic.

If, for any j, the set of signature generating computers involved in the j-th signature generating operation is $SS_j$ and the set of signature generating computers involved in the j+1-th signature generating operation is $SS_{j+1}$, then the intersection between $SS_j$ and $SS_{j+1}$ is not an empty set (in other words, at least one signature generating device will be involved in two consecutive signature generating operations).

For example, if k>n/2 in a k-out-of-n threshold signature generating operation, this characteristic will be met since at least 2k-n devices will be involved in two consecutive signature generating operations no matter how the k devices to be involved in signature generation are to be selected. Thus, the 2-out-of-3 threshold signature system used in the first embodiment meets this characteristic as well.

As described below, since this embodiment uses a signature method having the above characteristic, the need to send history data to signature generating devices not involved in signature generation, as in the first embodiment, is eliminated. In other words, the second point described above is resolved, and step 2007 and step 2008 from the "flow of operations for issuing timestamps" shown in FIG. 2 can be eliminated.

Figure 6:
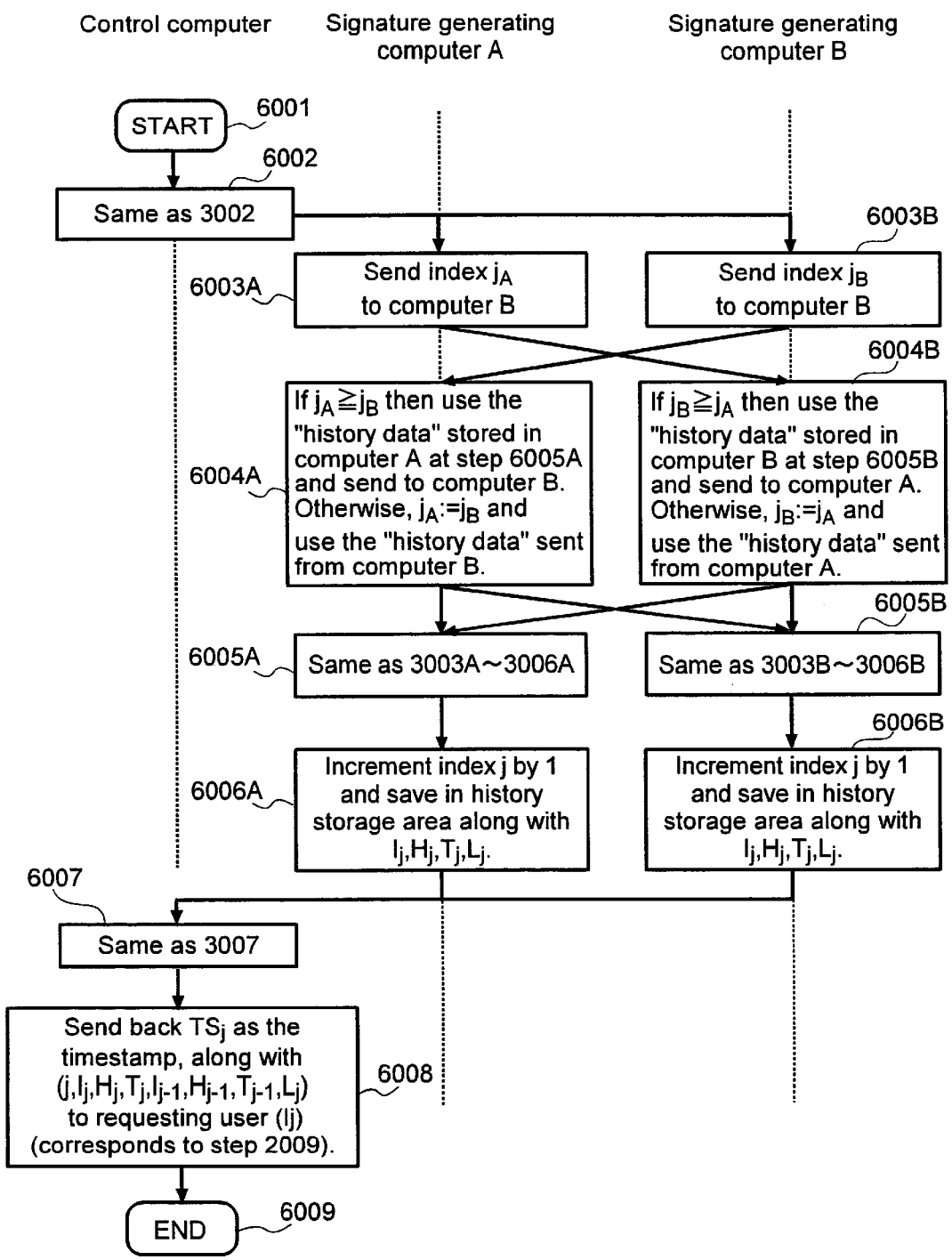
FIG. 6 illustrates a flowchart showing the detailed operations performed at step 2006 from the schematic flowchart for a second embodiment of the present invention.

The flow of operations performed at step 2006 in this embodiment is shown in FIG. 6.

Flow of Operations at Step 2006

Step 6001: Start

Operations Performed by the Control Computer

Step 6002: Same as step 3002.

Operations Performed by the Signature Generating Computer A 1051

Step 6003A: Send index $j_A$ stored in the computer A 1051 to the computer B 1060.

Operations Performed by the Signature Generating Computer B 1060

Step 6003B: Send index $j_B$ stored in the computer B 1060 to the computer A 1051.

Operations Performed by the Signature Generating Computer A 1051

Step 6004A: If $j_A \geq j_B$, use the "history data" stored in the computer A at step 6005A and send it to the computer B 1060. Otherwise, set $j_A := j_B$ and use the "history data" sent from the computer B 1060 at step 6005A.

Operations Performed by the Signature Generating Computer B 1060

Step 6004B: If $j_B \geq j_A$, use the "history data" stored in the computer B at step 6005B and send it to the computer A 1051. Otherwise, set $j_B := j_A$ and use the "history data" sent from the computer A 1051 at step 6005B.

Operations Performed by the Signature Generating Computer A 1051

Step 6005A: Same as step 3003A–3006A.

Operations Performed by the Signature Generating Computer B 1060

Step 6005B: Same as step 3003B–step 3006B.

Operations Performed by the Signature Generating Computer A 1051

Step 6006A: Increment index by 1 and save to the history storage region along with $I_j,H_j,T_j,L_j$.

Operations Performed by the Signature Generating Computer B 1060

Step 6006B: Increment index by 1 and save to the history storage region along with $I_j,H_j,T_j,L_j$.

Operations Performed by the Control Computer

Step 6007: Send back $TS_j$ as a timestamp as well as $(j,I_j,H_j,T_j,I_j,H_{j-1},T_{j-1},L_j)$ to the user ($I_j$) making the request (corresponds to step 2009).

Step 6008: End

This embodiment allows the legitimacy of the timestamped document to be confirmed as in the first embodiment.

Since this embodiment uses the distributed signature technology described in the characteristic above, the existence during signature generation of a signature generating computer that is aware of the most recent history is guaranteed. Furthermore, at step 6004A and step 6004B described above, indexes can be compared to determine which signature generating computer has the most recent history. More generally, if k signature generating computers are involved in signature generation, the computer with the most recent history can be determined by examining the computer with the highest recorded index. Thus, when the signature generating computers involved in signature generation update their history data, signature generation that passes on the most recent history data can be performed without requiring history data updates to the signature generating computers not involved in signature generation.

With this embodiment, the threshold signature method can be used to generate signatures that reflect data involved in the immediately preceding signature such as with the linking protocol described above. Thus, unlike the first embodiment, there is no need to perform communication operations to update history data in the signature generating computers that are not directly involved in signature generation. As a result, one of the characteristics of threshold signature generation—that signatures can be generated even if some devices are unavailable due to malfunction—can be maintained.

Furthermore, the data involved in the immediately preceding signature generating operation, which is used as history data, is either data stored in the local computer or data that has been sent from another signature generation computer. Thus, if all signature generating computers can be trusted, e.g., through the use of two-way authentication technology and technology to prevent data tampering in the communication paths between the signature generating computers, then the second condition described above, i.e., history data relating to the preceding signature generating operation must be set up from outside, can be eliminated.

Third Embodiment

The schematic system architecture in this embodiment is the same as what is shown in FIG. 1. Also, the threshold signature method (or, more generally, the distributed signature generating operation) used in this embodiment has the same characteristic indicated in the second embodiment.

In this embodiment, history data is passed on according to the method shown below. Specifically, when a signature is generated in the second embodiment, the latest history data at that point in time is passed on (forms a chain). In contrast, this embodiment performs signature generation so that history data contained in each of the signature generating devices involved in the issuing of a signature is passed on to all the signature generating devices involved in issuing the timestamp. Also, signatures are generated so that these chains are independently verifiable.

For example, a 2-out-of-3 threshold signature method is used and signatures are generated (timestamps are issued) with the following combinations of signature generating devices.

Sample Timestamp Issuing Sequence

| | | | |
|---|---|---|---|
| 1st signature: | A | B | |
| 2nd signature: | A | | C |
| 3rd signature: | | B | C |
| 4th signature: | A | | C |
| 5th signature: | A | | C |

When the third signature is generated using the signature generating computer B 1060 and the signature generating computer C 1070, the most recent history data for the signature generating computer B 1060 is the data relating to the generation of the first signature, and the most recent history data for the signature generating computer C 1070 is the data relating to the generation of the second signature. In this embodiment, both sets of history data are used to generate the third signature.

To use both sets of history data, the data can be joined (concatenated) into one unit. The history data can also contain identification information (e.g., information indicating how many signature generations back the history data is from).

Similarly, when the fourth signature is being generated by the signature generating computer A 1051 and the signature generating computer C 1070, information relating to the second signature generating operation performed by the signature generating computer A 1051 and the third signature generating operation performed by the signature generating computer C 1070 is used. For the fifth signature generating operation, data that combines two sets of data relating to the fourth signature generating operation is used.

In addition to the characteristic of the second embodiment where a generated signature always reflects the latest history data, this signature generating method provides another characteristic where a generated signature will always reflect the data stored in each of the signature generating computers used to generate the signature (i.e., data that is reliable for each of the signature generating computers).

Furthermore, the plurality of chains formed by this embodiment can be independently verified. Even if a malicious signature generating computer is involved in the generation of a signature and sends incorrect data as the latest history data, it will be possible to confirm at least one correct chain. This allows the effects resulting from a malicious signature generating computer to be contained.

This will be described below with reference to the sample timestamp issuing sequence shown above.

Figure 11:
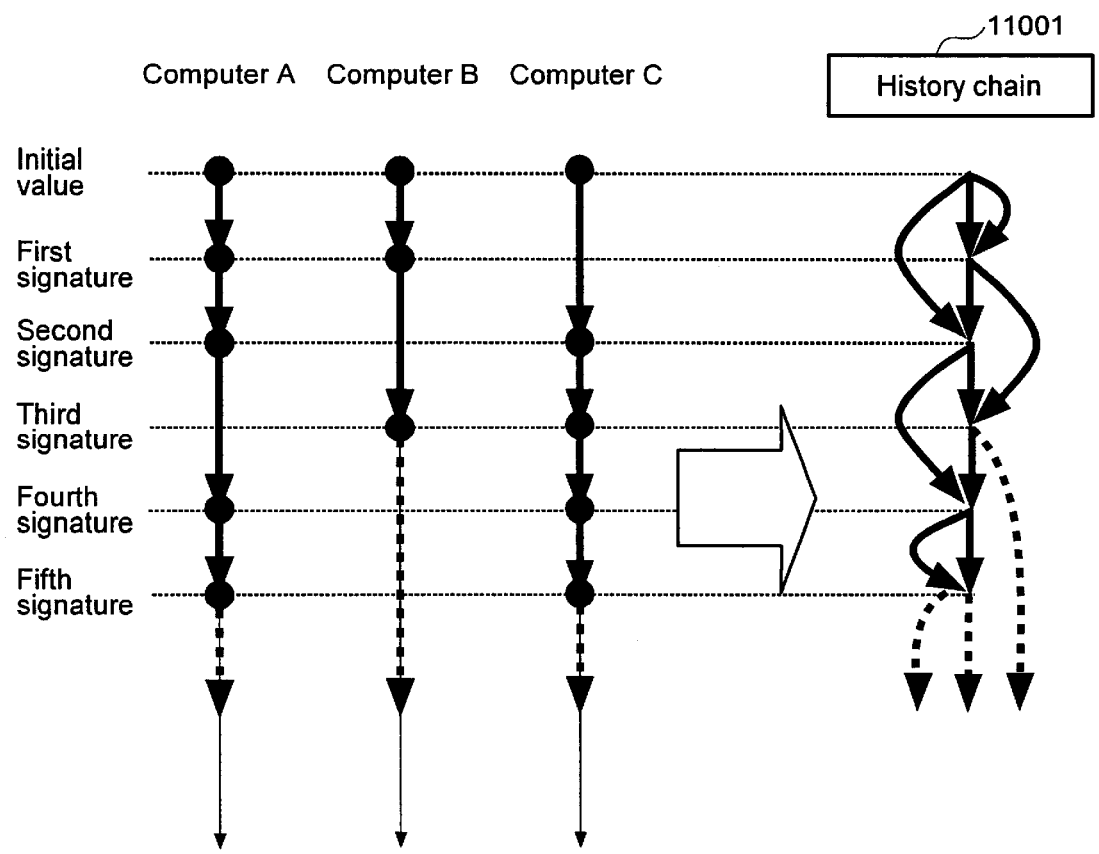
FIG. 11 illustrates a schematic representation of the chains that appear in the timestamp issuing sequence for the third embodiment of the present invention.

FIG. 11 shows a schematic representation of the chains that appear in the timestamp issuing sequence shown above. The arrows in chains 11001 indicate dependencies between signatures. As FIG. 11 shows, the generation of the fourth signature reflects history data involved in the second and third signature generating operations. Now, it will be assumed that when the fourth signature is being generated in this sample timestamp issuing sequence the signature generating computer C 1070 does not send the correct history data to the signature generating computer A 1051. In this case, it will not be possible to confirm the link with the history data from the third signature generating operation.

However, the legitimate signature generating computer A 1051 guarantees that the history data relating to the second signature generating operation will be correctly reflected in the fourth signature generating operation. Thus, it will be possible to confirm the link between the fourth and subsequent signature histories and the second and preceding signature histories. Thus, the influence of the improper act performed by the signature generating computer C 1070 only extends to the inconsistency between the third signature and the fourth signature.

In the conventional linking protocol described above, a break in the chain at one point (e.g., between the third signature and the fourth signature) will prevent confirmation of relationships between the third and earlier signatures and the fourth and subsequent signatures. This can lead to overall reliability being compromised. In contrast, this embodiment overcomes this problem as described above.

With this embodiment as described above, the second condition described above can effectively be relaxed even in cases where not all the signature generating computers can be trusted. Thus, in cases where not all the signature generating computers can be trusted but many of the signature generating computers can be trusted, this embodiment can provide a highly reliable timestamping system.

Figure 7:
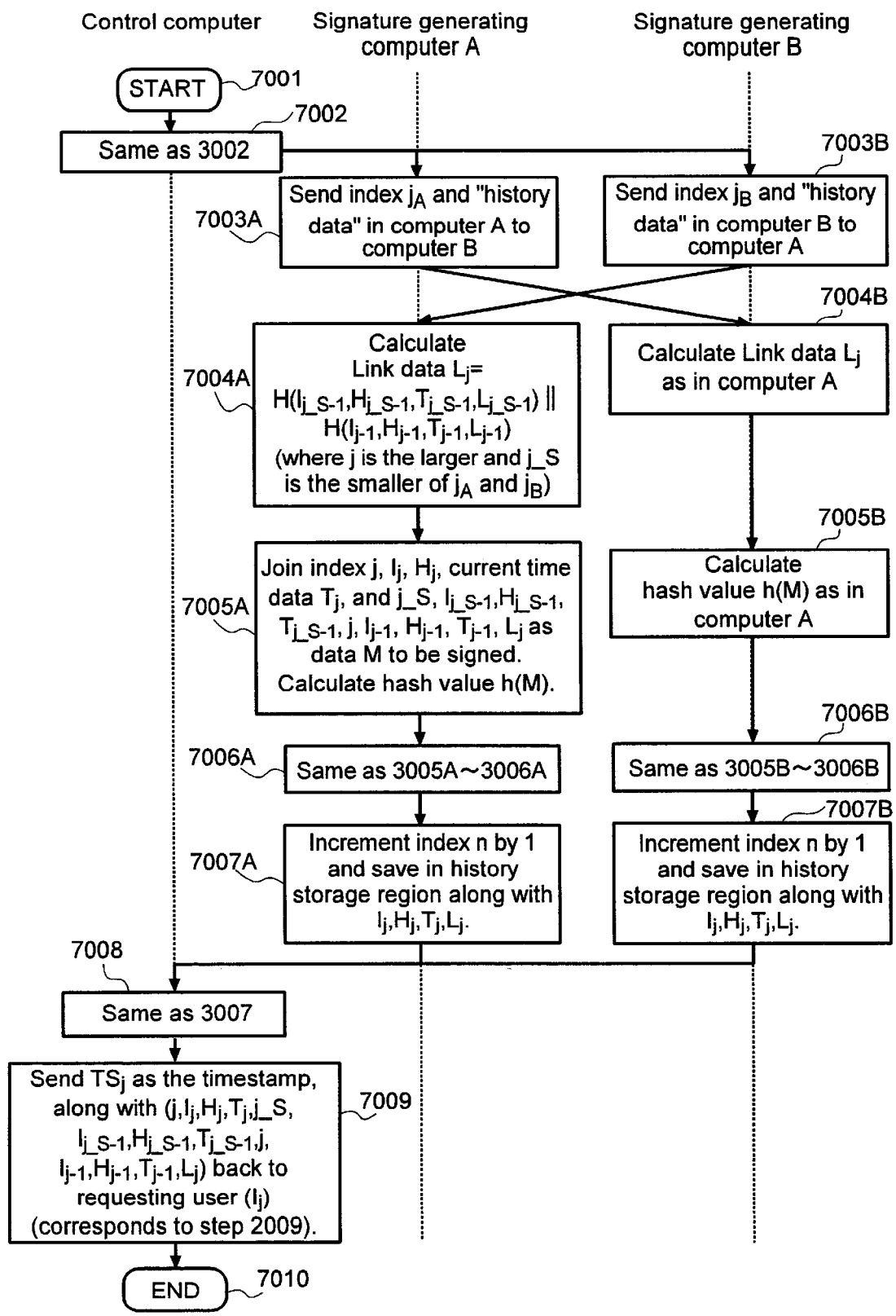
FIG. 7 illustrates a flowchart showing the detailed operations performed at step 2006 from the schematic flowchart for a third embodiment of the present invention.

FIG. 7 shows the detailed flow of operations performed in this embodiment at step 2006.

Detailed Flow of Operations Performed at Step 2006

Step 7001: Start

Operations Performed by the Control Computer 1031

Step 7002: Same as step 3002

Operations Performed by the Signature Generating Computer A 1051

Step 7003A: Send index $j_A$ and "history data" in A to B.

Operations Performed by the Signature Generating Computer B 1060

Step 7003B: Send index $j_B$ and "history data" in B to A.

Operations Performed by the Signature Generating Computer A 1051

Step 7004A: (j is the larger and j_S is the smaller of $j_A$ and $j_B$)

Calculate Link data $L_j = H(I_{j\_S-1}, H_{j\_S-1}, T_{j\_S-1}, L_{j\_\_S-1}) \| H(I_{j\_S-1}, H_{j\_S-1}, T_{j\_S-1}, L_{j\_s-1})$ | represents concatenation).

Operations Performed by the Signature Generating Computer B 1060

Step 7004B: Calculate $L_j$ as in the computer A 1051.

Operations Performed by the Signature Generating Computer A 1051

Step 7005A: Join index j, user ID $I_j$, hash value $H_j$, time $T_j$, obtained from the timer in the computer A 1051, and j_S, $I_{j\_S-1}, H_{j\_S-1}, T_{j\_S-1}, j, I_{j-1}, H_{j-1}, T_{j-1}, L_j$, and calculate data M to be signed. Calculate hash value h(M).

Operations Performed by the Signature Generating Computer B 1060

Step 7005B: Calculate h(M) as in the computer A 1051.

Operations Performed by the Signature Generating Computer A 1051

Step 7006A: Same as 3005A–3006A.

Operations Performed by the Signature Generating Computer B 1060

Step 7006B: Same as 3005B–3006B.

Operations Performed by the Signature Generating Computer A 1051

Step 7007A: Increment index j by 1 and save to the history storage region along with $I_j$, $H_j$, $T_j$, $L_j$.

Operations Performed by the Signature Generating Computer B 1060

Step 7007B: Increment index j by 1 and save to the history storage region along with $I_j$, $H_j$, $T_j$, $L_j$.

Operations Performed by the Control Computer

Step 7008: Same as step 3008.

Step 7009: Send back $TS_j$ as the timestamp, along with $(j, I_j, H_j, T_j, j\_S, I_{j\_S-1}, H_{j\_S-1}, T_{j\_S-1}, j, I_{j-1}, H_{j-1}, T_{j-1}, L_j)$ to the user ($I_j$) making the request (corresponds to step 2009).

Step 7010: End

Furthermore, in the linking protocol described above, confirmation that the chain is correctly reflected in the next signature is provided by sending the current user ID ($I_j$) to the user (user ID $j_A$) who used the signature generating computer A most recently and the user (user ID $j_B$) who used the signature generating computer B 1060 most recently.

To confirm the legitimacy of a timestamped document created according to this embodiment, the legitimacy of the timestamp (digital signature) $TS_j$ with regard to $(j, I_j, H_j, T_j, j\_S, I_{j\_S-1}, H_{j\_S-1}, T_{j\_j-1}, j, I_{j-1}, T_{j-1}, L_j)$ is checked with the public key of the timestamp issuing station using digital signature verification technology. If legitimacy cannot be confirmed, then the timestamp $TS_j$ cannot be accepted as legitimate.

Next, to provide more detailed confirmation that there were no irregularities at the timestamp issuing station, $L_{jA-1}$ is obtained by querying the user (user ID $j_A$) who last used the signature generating computer A (note: $j_A = j\_S$ or j). This allows confirmation of whether $H(I_{jA-1}, H_{jA-1}, T_{jA-1}, L_{jA-1})$ is identical to either the former half or latter half of link data $L_j = H(I_{j\_S-1}, H_{j\_S-1}, T_{j\_S-1}, L_{j\_S-1}) \| H(I_{j\_S-1}, H_{j\_S-1}, T_{j\_S-1}, L_{j\_s-1})$.

If confirmation fails, there is the possibility that, for example, the signature generating computer A is malfunctioning or is operating in an irregular manner (including cases of irregularities resulting from the introduction of improper data from outside) or that the data $I_{jA-1}, H_{jA-1}, T_{jA-1}, L_{jA-1}$ stored in the signature generating computer A is incorrect (or is not being used correctly). As a result, confirmation is performed using the other signature generating computer B 1060. The user (user ID $j_B$) who used the signature generating computer B 1060 most recently is queried to obtain $L_{jB-1}$, and $H(I_{jB-1}, H_{jB-1}, T_{jB-1}, L_{jB-1})$ is checked to see if it is identical to either the former half or latter half of $L_j$.

If this confirmation is successful, the timestamp $TS_j$ is accepted as legitimate in this verification method (or further verifying steps described can be used as necessary). Otherwise, $TS_j$ cannot be accepted as legitimate.

Confirmation with the cooperation of the user (user ID $j_B$) who used the signature generating computer B 1060 most recently can be performed without being affected by the signature generating computer A. Thus, the second conditions described above can be more effectively relaxed even if not all signature generating computers can necessarily be trusted or cooperation of the signature generating computer A cannot be obtained or the computer A is operating improperly.

Also, another advantage of this verification method is that verification can be performed easily even in cases where other users do not (or cannot) necessarily cooperate in verification. Even if $L_{jA-1}$ cannot be obtained because the user (user ID $j_A$) who used the signature generating computer A most recently does not respond to a query, verification can be performed if the cooperation of the user (user ID $j_B$) who used the signature generating computer B 1060 most recently can be obtained.

Furthermore, the user who uses the signature generating computer A next can be queried to determine if the value of $H(I_j, H_j, T_j, L_j)$ calculated from received data matches the former half or the latter half of the link data contained in the data received by the next user of the signature generating computer A.

If no match with the link data can be confirmed due to the signature generating computer A not operating correctly or a lack of cooperation by the subsequent user of the signature generating computer A, confirmation can still be performed by querying the subsequent user of the signature generating computer B 1060.

With this verification method, if a match with the link data of a subsequent user can be confirmed using at least one of the methods described above, the legitimacy of the timestamp can be confirmed (or further verifying steps described below are used as necessary). Otherwise, the timestamp cannot be confirmed as being legitimate.

As with the first and second embodiments, it is possible in this embodiment to provide more detailed confirmation of the legitimacy of a timestamp by repeating the procedure described above so that users from two signatures back or more and users two signatures later or more can be queried.

Fourth Embodiment

Figure 8:
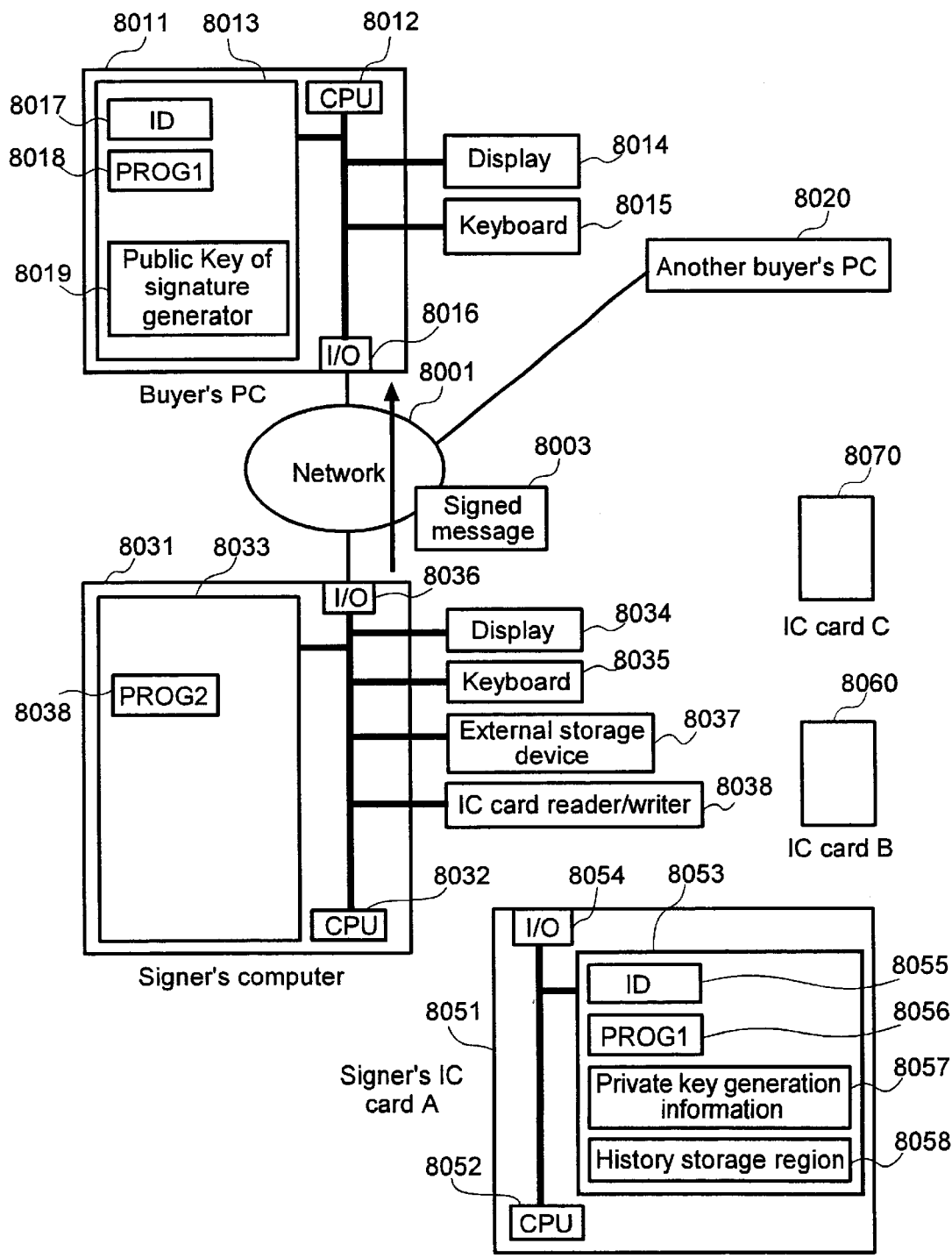
FIG. 8 illustrates a schematic drawing of a system in which a fourth embodiment of the present invention is implemented.

FIG. 8 shows a schematic architecture of a system in which the present invention is implemented for the signature system disclosed in Document 12: Japanese patent application No. 2000-313123

Document 12 discloses a technology where histories of generated signatures are stored to allow signatures to be checked for unauthorized forgery. When a signature is generated, the previously generated signature itself is reflected in the next signature generating operation. This forms a signature history chain that can be safely stored. Since signatures are generated using a plurality of devices (IC cards in this embodiment), essentially any of the methods used in the first through the third embodiments can be used to generate signatures so that a chain is formed correctly. In this embodiment, an example where signatures are generated as in the third embodiment will be described.

A network 8001 connects a signer's computer 8031 and buyer's PCs 8011, 8020. When a buyer purchases (whether for a fee or not) a message from the signer (e.g., digitized multimedia data such as electronic images, video, or music or electronic (digitized) securities, contracts, or the like), a message 8003 signed by the signer is received by way of the network 8001.

The buyer's PC 8011 is formed from a CPU 8012, a memory 8013, an I/O 8016, a display 8014, and a keyboard 8015. These elements are connected through a bus. The I/O 8016 provides a connection to the network 8001. The memory 8013 stores a buyer ID 8017, a program PROG1 8018, and a public key 8019 of the signer. The program is transferred to the CPU 8012 over the bus and provides various features.

The signer's side is formed from the signer's computer 8031, and the signer's IC card A 8051, IC card B 8060, and IC card C 8070. As with the embodiments above, this embodiment uses a 2-out-of-3 threshold signature method. Thus, while three IC cards are used, the number of cards can be set up according to the signature scheme to be used. Other distributed signature technologies can be used as well.

The signer's computer 8031 is formed from a CPU 8032, a memory 8033, an I/O 8036, a display 8034, a keyboard 8035, an external storage device 8037, and an IC card reader/writer 8038. These are connected by a bus, and the I/O 8036 provides a connection to the network 8001. The IC card reader/writer 8038 provides communication with the IC cards. The memory 8033 contains a program PROG2 8038.

The signer's IC cards A 8051, B 8060, and C 8070 have essentially the same structures. A CPU 8052, a memory 8053, and an I/O 8054 are connected by a bus. An I/O 8037 provides a connection to the signer's computer. The memory 8053 contains an ID 8055, a program PROG3 8056, and private key generating information 8057 as well as a history storage region 8058 for storing data (history data) relating to digital signatures generated earlier. The ID 8055 and the private key generating information 8057 contain values specific to the particular computer.

Figure 9:
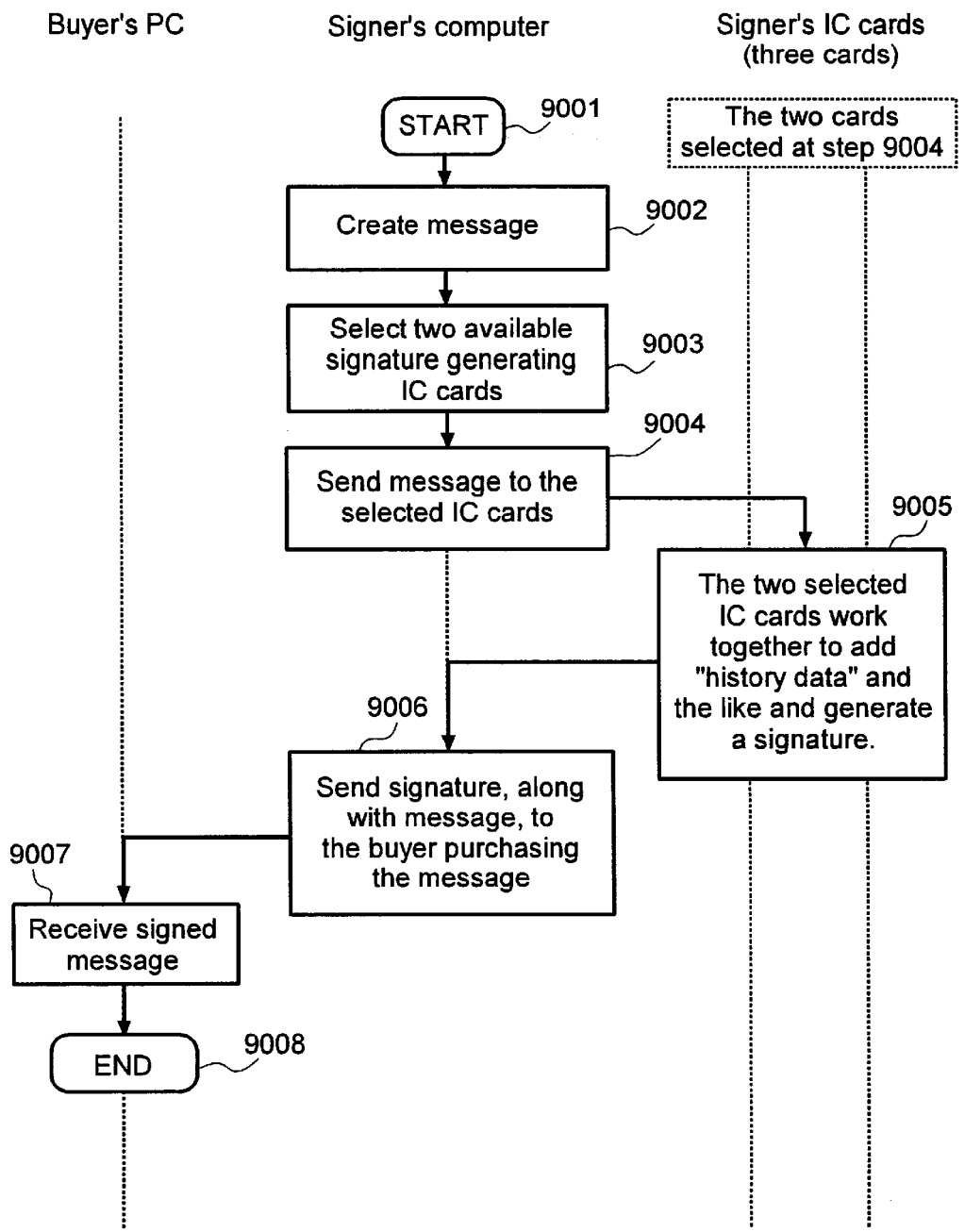
FIG. 9 illustrates a schematic flowchart of the operations performed to generate signatures in the fourth embodiment of the present invention.

FIG. 9 shows a schematic diagram of the flow of operations performed in this embodiment.

Figure 10:
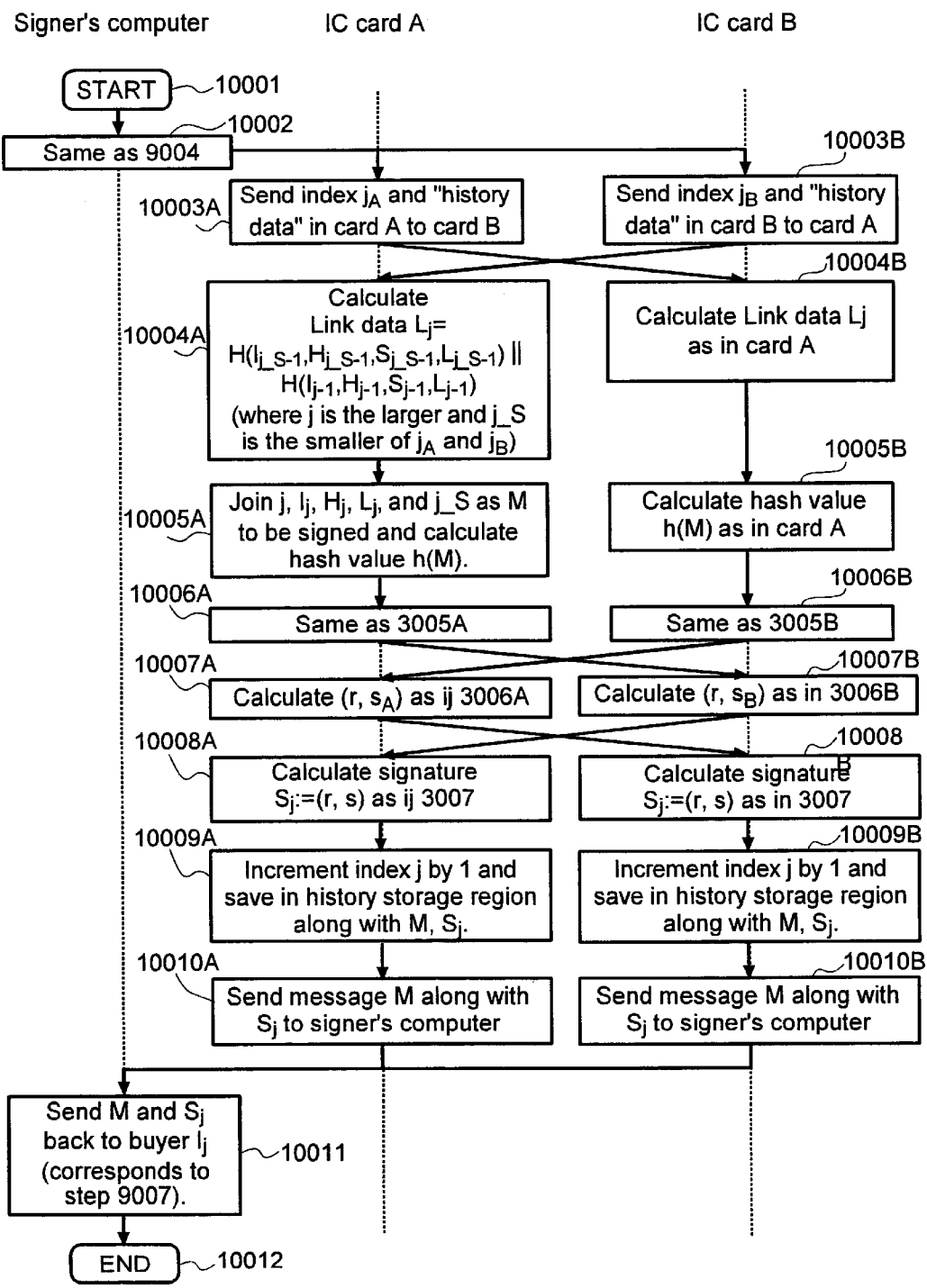
FIG. 10 illustrates a flowchart showing the detailed operations performed at step 9005 from the schematic signature generation flowchart for the fourth embodiment of the present invention.

Flow of Operations for Generating Signatures
   Step 9001: Start
Flow of Operations Performed by the Signer's Computer
   Step 9002: Create message to be purchased
   Step 9003: Select two available signature generating IC cards out of the three signature generating IC cards.
   Step 9004: Send the document received from the signer's computer to the IC cards selected at step 9003.
Flow of Operations Performed by the Signature Generating IC Cards (the IC cards selected at step 9003)
   Step 9005: The two selected IC cards work together to add "history data" and the like to the document, generate a signature based on the threshold signature method, and send the signed document to the signer's computer. Depending on the threshold signature method that is used, there may be multiple communications between the signer's computer and the IC cards.
Operations Performed by the Signer's Computer
   Step 9006: Send the generated signature along with the document to the buyer purchasing the message.
Operations Performed by the Buyer's PC
   Step 9007: The buyer receives the signed document from the signer. After verifying that the signature is legitimate, the buyer receives the signed document.
   Step 9008: End FIG. 10 shows the detailed flow of operations performed at step 9005 in the flow of operations performed for generating signatures.
   Step 10001: Start
Operations Performed by the Signer's Computer 8031
   Step 10002: Same as step 9004
Operations Performed by the Signature Generating IC Card A 8051
   Step 10003A: Send the index $j_A$ in the IC card A 8051 and the "history data" in the IC card A 8051 to the IC card B 8060.
Operations Performed by the Signature Generating IC Card B 8060
   Step 10003B: Send the index $j_B$ in the IC card B 8060 and the "history data" in the IC card B 8060 to the IC card A 8051.
Operations Performed by the Signature Generating IC Card A 8051
   Step 10004A: (j is the larger and j_S is the smaller of $j_A$ and $j_B$) Calculate Link data $L_j = H(I_{j\_S-1}, H_{j\_S-1}, S_{j\_S-1}, L_{j\_S-1}) \| H(I_{j-1}, H_{j-1}, S_{j-1}, L_{j-1})$ ($\|$ represents concatenation).
Operations Performed by the Signature Generating IC Card B 8060
   Step 10004B: Calculate link data $L_j$ as done in the IC card A 8051.
Operations Performed by the Signature Generating IC Card A 8051
   Step 10005A: Join j, $I_j$, $H_j$, $L_j$, and j_S as the data M to be signed and calculate hash value h(M).
Operations Performed by the Signature Generating IC Card B 8060
   Step 10005B: Calculate hash value h(M) as done in the IC card A 8051.
Operations Performed by the Signature Generating IC Card A 8051
   Step 10006A: Same as 3005A.
Operations Performed by the Signature Generating IC Card B 8060
   Step 10006B: Same as 3005B.
Operations Performed by the Signature Generating IC Card A 8051
   Step 10007A: Calculate (r, $s_A$) as in 3006A.

Operations Performed by the Signature Generating IC Card B 8060

Step 10007B: Calculate (r, $s_B$) as in 3006B.

Operations Performed by the Signature Generating IC Card A 8051

Step 10008A: Calculate signature $s_j$:=(r,s) as in 3007.

Operations Performed by the Signature Generating IC Card B 8060

Step 10008B: Calculate signature $s_j$:=(r,s) as in 3007.

Operations Performed by the Signature Generating IC Card A 8051

Step 10009A: Increment index j by 1 and store in the history storage region along with M=(j, j__S, $I_j$, $H_j$, $L_j$), $S_j$.

Operations Performed by the Signature Generating IC Card B 8060

Step 10009B: Increment index j by 1 and store in the history storage region along with M=((j, j__S, $I_j$, $H_j$, $L_j$), $S_j$.

Operations Performed by the Signature Generating IC Card A 8051

Step 10010A: Send message M together with $S_j$ to the signer's computer 8031.

Operations Performed by the Signature Generating IC Card B 8060

Step 10010B: Send message M together with $S_j$ to the signer's computer 8031.

Operations Performed by the Signer's Computer 8031

Step 10011: Send message M and signature $S_j$ to the buyer $I_j$.

Step 10012: End

When performing input/output operations to the IC cards in the steps above, the signer's computer or another computer can act as an intermediary when necessary.

The signature $S_j$ generated in this manner can be verified as described below. The operations performed below can be performed by the buyer or by a mediator who receives a request from the buyer or some other party. In the following description, this will be referred to as the verifier.

Using a verification computer formed in the same manner as the user PC 1011, the verifier first verifies the legitimacy of the signature $S_j$ with known digital signature verification technology using the signer's public key 8019. If legitimacy cannot be confirmed, the signature $S_j$ cannot be accepted as a legitimate signature. If legitimacy can be confirmed, further steps can be performed if needed in order to provide more detailed verification. These steps may need to be performed in cases such as when there is a loss of reliability in the known digital signature technology due to leakage of the signer's private key information used to generate the signature $S_j$ or the like, thus making the procedure described above inadequate. Alternatively, these steps may need to be performed, for example, if the message M is especially valuable and very thorough verification is needed.

Next, the verifier receives the signature history from the signer and confirms that the signature $S_j$ is contained. If it is not, then the signature $S_j$ cannot be accepted as being a legitimate signature.

If the signature $S_j$ is found, one of the two IC cards (IC card A and IC card B will be used here) involved in generating the signature $S_j$ searches for a signature history relating to a signature $S_j'$ generated immediately after the generation of the signature $S_j$. The link data in this signature history is checked to see if either the former half or the latter half matches H($I_j$, $H_j$,$S_j$, $L_j$) calculated from the data contained in the signature history for the signature $S_j$. If not, the other IC card searches for the signature history of the signature generated immediately after the generation of the signature $S_j$, and a similar check is made. If there is no match, the signature $S_j$ cannot be accepted as a legitimate signature.

If there is a match, a similar confirmation operation is repeated for the signature $S_j'$. If confirmation can be achieved as far back in the chain as a signature that is known beforehand as being reliable for some reason (e.g., a signature that had been made public through the mass media or the like, data guaranteed by a reliable third party, or, when signature $S_j$ is being verified, the contents are guaranteed by a disinterested third party). Otherwise, the signature cannot be accepted as legitimate.

By using this verification method as described above, security can be maintained even if the security of the current digital signature system described in document 12 is compromised for some reason. Furthermore, legitimacy can be confirmed even if a portion of the signature history is lost or becomes unusable. This provides a method and system that is reliable even when history data must be maintained over long periods.

Fifth Embodiment

One of the aspects of the present invention provides a method for generating signatures that reflect not only the signature history generated one generation earlier but also signature histories from further back. This method can be implemented to provide further reliability in single-device signature generating systems and timestamp systems in the event of history loss or the like. For example, in the signature system described in document 12, when a signature is generated, the signature reflects the signature history generated in the previous operations as well as the n signature histories from the n preceding signature generating operations. When verifying, a signature is confirmed as being correct if at least one link of the n histories is confirmed. This method that maintains histories spanning a long period provides a more reliable system with regard to history loss as long as n consecutive signature histories are not lost. Generating signatures so that n signature histories are reflected can be performed by calculating the data to be signed in the same manner as in step 10004A, 10005A from the fourth embodiment.

If verification is performed so that confirmation is provided only if all n links are confirmed, the tolerance to history loss is not provided but signature tampering is made more difficult. The reason for this is that correctly maintaining all n links requires determining the pre-images for each of the n hashes contained in the signature to be verified.

It would also be possible to confirm legitimacy if k links out of n can be confirmed (where n>k). This makes signature tampering difficult while improving tolerance to history loss.

These rules for verification can be determined when a signature is generated or can be determined beforehand when the system is set up. Alternatively, the rules can be determined according to factors such as the technical environment, the desired level of security for the entire system, and the like when the need for actually verifying a signature comes up.

With regard to how multiple sets of history data are reflected during signature generation, besides joining (concatenating) history data, it would also be possible to use other verifiable methods that are suited for the verification rules described above. Examples include XOR or addition operations and hash functions or these combinations.

One specific example is that, when there is a rule that confirmation is provided only if all n links are confirmed, the digital signature $S_j$ for the message $m_j$ under the rule is generated by signing the data (Hash$_3$($m_j$)||$L_j$), where $L_j$=Hash$_2$(Hash$_1$($m_{j-n}$||$S_{j-n}$|| n)||Hash$_1$($m_{j-)n-1)}$||$S_{j-(n-1)}$||n−1) ||, , , ||Hash$_1$($m_{j-1}$||$S_{j-1}$||)), and Hash$_1$, Hash$_2$ and Hash$_3$ denote hash functions.

The timestamp services in document 5 through document 7 use a method in which the linking protocol is formed as a tree structure to allow fast confirmation of links between a plurality of timestamps. This embodiment provides advantages not disclosed in document 5 through document 7 such as improved tolerance to history loss and greater difficulty for signature tampering In the embodiments described above, examples are presented of timestamp services that apply a digital signature to the data to be signed along with time information. However, the present invention can also be used to provide digital signatures without the addition of time information and to provide a service to confirm the existence of signed data from history data.

The present invention as described above provides security and usefulness in the generation and use of digital signatures.

The specification and drawings are, accordingly, to be regarded in an illustrative rather than a restrictive sense. It will, however, be evident that various modifications and changes may be made thereto without departing from the broader spirit and scope of the invention as set forth in the claims.

We claim:

1. A method for sequentially generating digital signatures using n devices, each of said devices equipped with signature generator, said method comprising the steps of:

generating a history data j when generating a j-th digital signature ($j \geq 1$);

storing, in m devices ($1 \leq m \leq n$) out of said n devices involved in an i-th digital signature generating operation, said history data j; and generating an i-th digital signature i using at least one of the L ($1 \leq L < i$) stored history data $j_1$-$j_L$.

2. A method for generating digital signatures according to claim 1, wherein said history data j is either digital signature j generated by said j-th signature generating operation or is data used when generating said digital signature j generated by said j-th signature generating operation.

3. A method for generating digital signatures according to claim 1, wherein said step for generating said history data j is performed in one of said m devices involved in an i-th digital signature generating operation.

4. A method for generating digital signatures according to claim 1, said method further comprising in each of said m devices when a digital signature is generated using said m devices:

sending a most recent stored history data to m−1 other devices, selecting most recent history data from m units of history data, formed from m−1 units of history d at a sent by said m−1 other devices and a most recent history data stored locally, and using said most recent history data as one of history data used when generating said i-th digital signature.

5. A method for generating digital signatures according to claim 1 wherein:

said step for generating said history data j is performed on one of said n−m devices;

said step for storing comprises the steps of: sending, in at least one device of said n-m devices, said history data j to said m devices; and storing, in said m devices, said sent history data.

6. A method for generating digital signatures according to claim 1, wherein a history data (i−1) and at least one history data k (k<i−1) is used as history data used in said step for generating a new i-th digital signature.

7. A method for generating digital signatures according to claim 1, further comprising the step of:

generating an i'-th digital signature i' (i'≠i, i'>j) using the history data used in said step of generating an i-th digital signature.

8. A method for verifying digital signatures generated by using the method according to claim 1, comprising the step of:

confirming that, when verifying said digital signature i, use of a plurality of history data, each of said history data used in said step for generating an i-th digital signature, satisfies a predetermined rule.

9. A method for verifying digital signatures according to claim 8, wherein said predetermined rule is that all of said plurality of history data is used in said step for generating said i-th digital signature.

10. A method for verifying digital signatures according to claim 8, wherein said predetermined rule is defined during system operation, during signature generation, or during signature verification.

11. A method for verifying digital signatures generated by using the method according to claim 7, comprising the step of:

confirming that, when verifying said digital signature i, use of a history data i in at least one step for generating digital signature h(h>i), said history data i is generated in a step for generating said digital signature i, satisfies a predetermined rule.

12. A method for verifying digital signatures according to claim 11, wherein said predetermined rule is that said history data i is used in all of said steps for generating digital signature h.

13. A method for verifying digital signatures according to claim 11, wherein said rule is defined during system operation, during signature generation, or during signature verification.

* * * * *